United States Patent
Gajic (10) Patent No.: US 7,873,496 B2
(45) Date of Patent: Jan. 18, 2011

(54) METHOD AND DEVICE FOR FAULT DETECTION IN AN N-WINDING THREE-PHASE POWER TRANSFORMER

(75) Inventor: Zoran Gajic, Västerås (SE)

(73) Assignee: ABB Technology Ltd., Zürich (CH)

( * ) Notice: Subject to any disclaimer, the term of this patent is extended or adjusted under 35 U.S.C. 154(b) by 271 days.

(21) Appl. No.: 11/629,775

(22) PCT Filed: Aug. 24, 2006

(86) PCT No.: PCT/EP2006/065624

§ 371 (c)(1),
(2), (4) Date: Oct. 20, 2008

(87) PCT Pub. No.: WO2007/057240

PCT Pub. Date: May 24, 2007

(65) Prior Publication Data

US 2009/0059447 A1    Mar. 5, 2009

(30) Foreign Application Priority Data

Dec. 9, 2005    (SE) .................................... 0502749

(51) Int. Cl.
*G06F 19/00*    (2006.01)
(52) U.S. Cl. ..................................................... 702/185
(58) Field of Classification Search .................. 702/76, 702/77, 182–185
See application file for complete search history.

(56) References Cited

U.S. PATENT DOCUMENTS

| 4,156,186 A | * | 5/1979 | Wolfinger .................... 324/108 |
| 6,507,184 B1 | | 1/2003 | Elston |
| 2006/0276979 A1 | * | 12/2006 | Price ........................... 702/59 |

FOREIGN PATENT DOCUMENTS

RU    2162269 C2    1/2001

(Continued)

OTHER PUBLICATIONS

Zoran Gajic; Universal Differential Protection for Power Transformers; IEEE; Apr. 20, 2006; pp. 1-6.
PCT/ISA/201—International Type Search Report, Dec. 9, 2005.

(Continued)

*Primary Examiner*—Edward Raymond
(74) *Attorney, Agent, or Firm*—Venable LLP; Eric J. Franklin (57) ABSTRACT

A method and a device for fault detection in an n-winding, three-phase power transformer. For each of the windings (Wi) the three phase currents ($I_{L1\_Wi}$; $I_{L2\_Wi}$; $I_{L3\_Wi}$) are measured. For each of the windings (Wi) deciding if a zero sequence current ($I_{0\_Wi}$) reduction is to be performed depending on at least one user setting ($k_{Wi}$) and if so, deducting the zero sequence current ($I_{0\_Wi}$) from each of the three phase currents ($I_{L1\_Wi}$; $I_{L2\_Wi}$; $I_{L3\_Wi}$). For each of the windings (Wi) generating normalized currents by performing a magnitude compensation and a phase angle shift compensation on the results of the previous step. For each of the three phases (Lx) comparing the normalized current of a single winding with the normalized currents of all other windings. For each phase (Lx) generating a fault signal, if a difference between the single winding (W1) and all other windings (W2, . . . , Wn) exceeds a predefined level.

19 Claims, 2 Drawing Sheets

FOREIGN PATENT DOCUMENTS

| WO | WO 2005/064759 A1 | 7/2005 |
| WO | WO 2005/078885 A1 | 8/2005 |
| WO | WO 2005/078886 A1 | 8/2005 |

OTHER PUBLICATIONS

PCT/ISA/210—International Search Report, Dec. 9, 2005.
PCT/ISA/237—Written Opionion of the International Searching Authority, Dec. 9, 2005.

* cited by examiner

METHOD AND DEVICE FOR FAULT DETECTION IN AN N-WINDING THREE-PHASE POWER TRANSFORMER

CROSS-REFERENCE TO RELATED APPLICATIONS

This application claims priority under 35 U.S.C. §119 to Swedish patent application 0502749-5 filed 9 Dec. 2005 and is the national phase under 35 U.S.C. §371 of PCT/EP2006/065624 filed 24 Aug. 2006.

TECHNICAL FIELD OF THE INVENTION

This present invention relates to a method and a device for advanced and improved fault detection in an n-winding three-phase power transformer. The method and device can be used in the differential protection of all types of power transformers including phase shifting transformers.

BACKGROUND OF THE INVENTION

Differential current measurement is a technique used in a wide variety of power system applications. For example, the technique is often used in the protection of power system equipment, such as transformers, generators, motors, and the like. Generally, differential current measurement techniques involve monitoring the current at both an input terminal and an output terminal of a device, normalizing the measured input and output currents to compensate for changes in phase and magnitude of the measured currents that may be introduced by the device during normal operation, and then comparing the normalized input and output currents. If the difference between the normalized input and output currents is zero, then the device presumably is working properly. On the contrary, a detected difference between the normalized input and output currents may indicate a fault within the device. In response to the detection of a fault, a differential relay issues a trip command to relevant circuit breakers in order to shut off the power to the protected object and to prevent further damage.

Due to the restructuring of the power industry with the main goal of the liberalization of the electricity market, more strict requirements for control of active and reactive power flow are posed on the electrical utilities. This process indicates that there is an increasing need for appropriate tools to control the power flow within a given network. A most commonly used device for this purpose is a power transformer of special construction often called phase shifting transformer (PST) or phase angle regulating transformer (PAR).

In principle, the technical aspects of a phase shifting transformer are rather simple: It provides a well defined, but changeable phase shift between the primary and secondary terminals. Normally, the phase shift may be varied during operation in definite steps by use of one or more on load tap changers (OLTC). In most cases the sign of the phase shift can be reversed from advance to retard.

Different types of PST designs are presently available. This makes the protection scheme for every type of PST rather unique and thus difficult. Currently, there is no relay manufacturer, which can provide a unique differential protection relay for all of these devices, regardless their design.

Within this area of technology several inventions try to deal with these kinds of problems and some patents have been granted.

PRIOR ART

Standard power transformers are electrical devices, which provide voltage magnitude variation and constant phase angle shift across the power transformer. The phase shift can have a value of n*30° (n is an integer between 0 and 11), depending on particular transformer construction details.

Power transformer differential protection has been used for decades. With static or electromechanical relays external interposing CTs are used in order to compensate for phase angle shift and current magnitude variation between two sides of the protected power transformer. However the following shortcomings are well known:
- a differential relay can be balanced only for the middle position of an on-load tap-changer (i.e. OLTC)
- as soon as the OLTC is moved from the mid-position, the differential relay is not any more completely balanced
- by interposing CTs it is only possible to compensate for a power transformer phase shift which is a multiple of 30°

With numerical relays external interposing CTs are not required. Compensation is provided internally within the relay by software. The following are characteristics of a numerical differential relay:
- the differential relay can compensate for a current magnitude variation caused by an OLTC if the OLTC position is given to the relay (i.e. the relay is balanced for any position)
- by software settings it is possible to compensate for a fixed phase shift of a power transformer which must be a multiple of 30°.

A non-standard power transformer is defined as a power transformer having variable phase angle shift or fixed phase angle shift other then 30° or a multiple of 30°.

Different designs of special power transformers known as PST are presently available, as described in International Standard IEC 62032. This makes the protection scheme for every type of PST quite unique and thus difficult, as described in IEEE/PSRC special report "Protection of Phase Angle Regulating Transformers (PAR)". Currently there is no differential relay, which can provide differential protection for any PST regardless its design and maximum phase angle shift.

The reason is that due to the continuously changing phase shift of the PST, a false differential current will appear. The magnitude of this false differential current can be estimated in accordance with the following equation:

$$I_d = I_{load} \cdot 2 \cdot \sin\left(\frac{\Theta}{2}\right) \qquad (1.1)$$

where:
- $I_d$ is the magnitude of the false differential current,
- $I_{load}$ is the PST through-load current, and
- $\Theta$ is the phase angle shift between the two PST sides.

In the U.S. Pat. No. 6,507,184 a method and an apparatus for differential current measurement in a three-phase power system are disclosed. This invention is arranged to measure the differential current between a first and a second terminal and to obtain, for each phase, a measure of these currents.

However this method does not allow for a settable reduction of zero sequence currents and does not provide for magnitude compensation.

Another problem which cannot be solved by applying traditional power transformer differential protection is the recognition of a low-level turn-to-turn fault, when only a few turns of the power transformer windings are short-circuited. In this case only very small changes in the currents at the transformer terminals will be measurable, while a high fault current occurs in the short-circuited turns. This is due to the comparatively high ratio of transformation between the transformer winding as a whole and the few short-circuited terms. The sensitivity of fault detection methods during differential protection known to this day is not sufficient to recognize this winding turn-to-turn fault before it develops into a more serious earth-fault, which is costly to repair, especially if it affects the iron core of the power transformer. An undetected turn-to-turn fault may also be the cause of hazardous arcing within the oil tank of a power transformer.

A way to detect such turn-to-turn faults can be the use of a so called Buchholz relay, also known as gas relay or sudden pressure relay. The Buchholz relay is applied to oil-filled transformers which are equipped with an external oil reservoir, called a conservator. When a turn-to-turn fault occurs, gas develops and rises to the top of the oil. A resulting change in the oil flow is detected by a float operated switch in the relay. A drawback of Buchholz relays is the time that passes between the occurrence of the turn-to-turn fault and its actual detection, which usually amounts to 50 to 100 ms. This time period can be long enough to allow the initial turn-to-turn fault to evolve into a more serious one.

This lapse of time can be very important, as a study of the records of modern power transformer breakdowns over the last years shows. Between 70% and 80% of the total number of transformer failures are eventually traced back to internal winding insulation failure. The failure of the winding insulation is mostly a result of a gradual aging process leading to the degradation of the insulation system due to thermal, electrical and mechanical stress and to moisture. Under increased stress the already degradated insulation may suffer a dielectric failure between adjacent turns, so that a turn-to-turn fault develops. Since aging is an mostly inevitable process, it is important to take turn-to-turn faults into account during fault detection.

SUMMARY OF THE INVENTION

The object of the present invention is to solve above indicated problems and present a method and a device for efficient fault detection in an n-winding, three-phase power transformer, where the fault detection is suitable to be used in the differential protection of any power transformer including transformers with non-standard phase shift.

Another object of the present invention is to provide dynamic current magnitude compensation.

A further object of the present invention is to provide dynamic phase angle compensation for arbitrary phase shift between the two sides of the protected object.

Still another object of the present invention is to provide independent (i.e. per side) zero-sequence current reduction.

Another object of the present invention is to compensate for one, two or even more OLTCs within the same power transformer.

Another object of the present invention is to provide differential protection with advanced numerical technology. With such a device it will be possible to provide universal differential protection for power transformers with arbitrary phase shift and current magnitude variations due to OLTC operation.

These objects are achieved according to the present invention by a method, a device and a computer program product.

BRIEF DESCRIPTION OF DRAWINGS

For better understanding of the present invention, reference will be made to the appended drawings.

DETAILED DESCRIPTION OF PREFERRED EMBODIMENTS

The method according to the invention is described in connection with FIG. 1 where the principle for differential protection of a protected object in a three-phase power system, in particular of a PST, is disclosed in a flow chart. The first step $1a,b$ is, for each side of the protected object 10 as defined in FIG. 2, to measure all phase currents of the protected object 10, on its both sides. The second step $2a,b$ is to decide whether to do zero sequence current reduction or not. This depends on the user setting $7a,b$. If zero sequence current reduction should be done then zero sequence currents will be deducted $12a,b$. The values of the zero sequence currents are inserted in $11a,b$.

The third step $3a,b$ is to perform magnitude compensation by using the base current $8a,b$. The fourth step $4a,b$ is to perform phase angle compensation by using the phase angle $9a,b$ of the respective side of the protected object 10.

Then the resulting signal from both sides are combined and the differential currents is calculated in the fifth step 5.

Finally in step 6 differential protection algorithm is performed.

Figure 1:
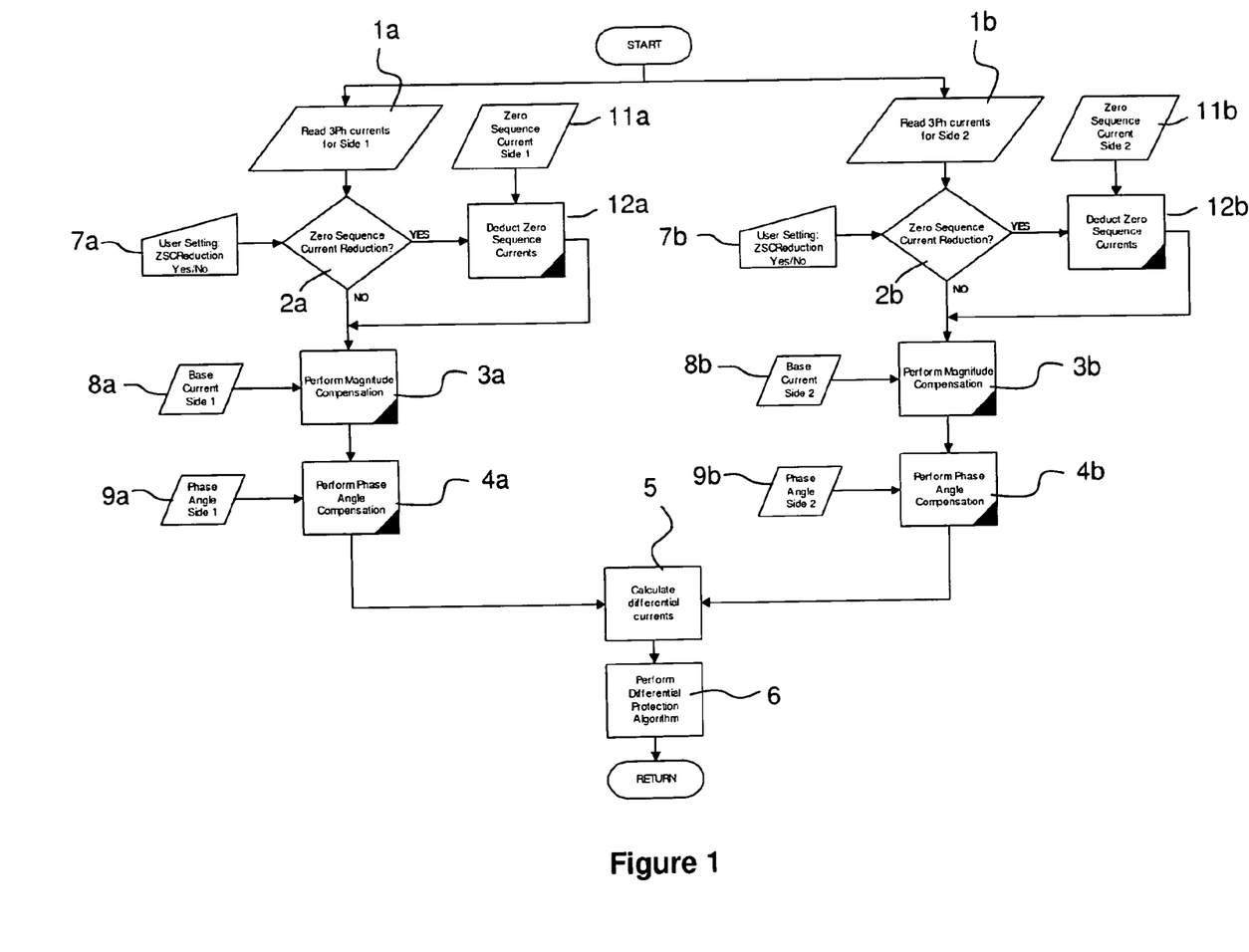
FIG. 1 illustrates a flow chart of a method of measuring and calculating the differential currents of an protected object in order to perform differential protection.
Figure 2:
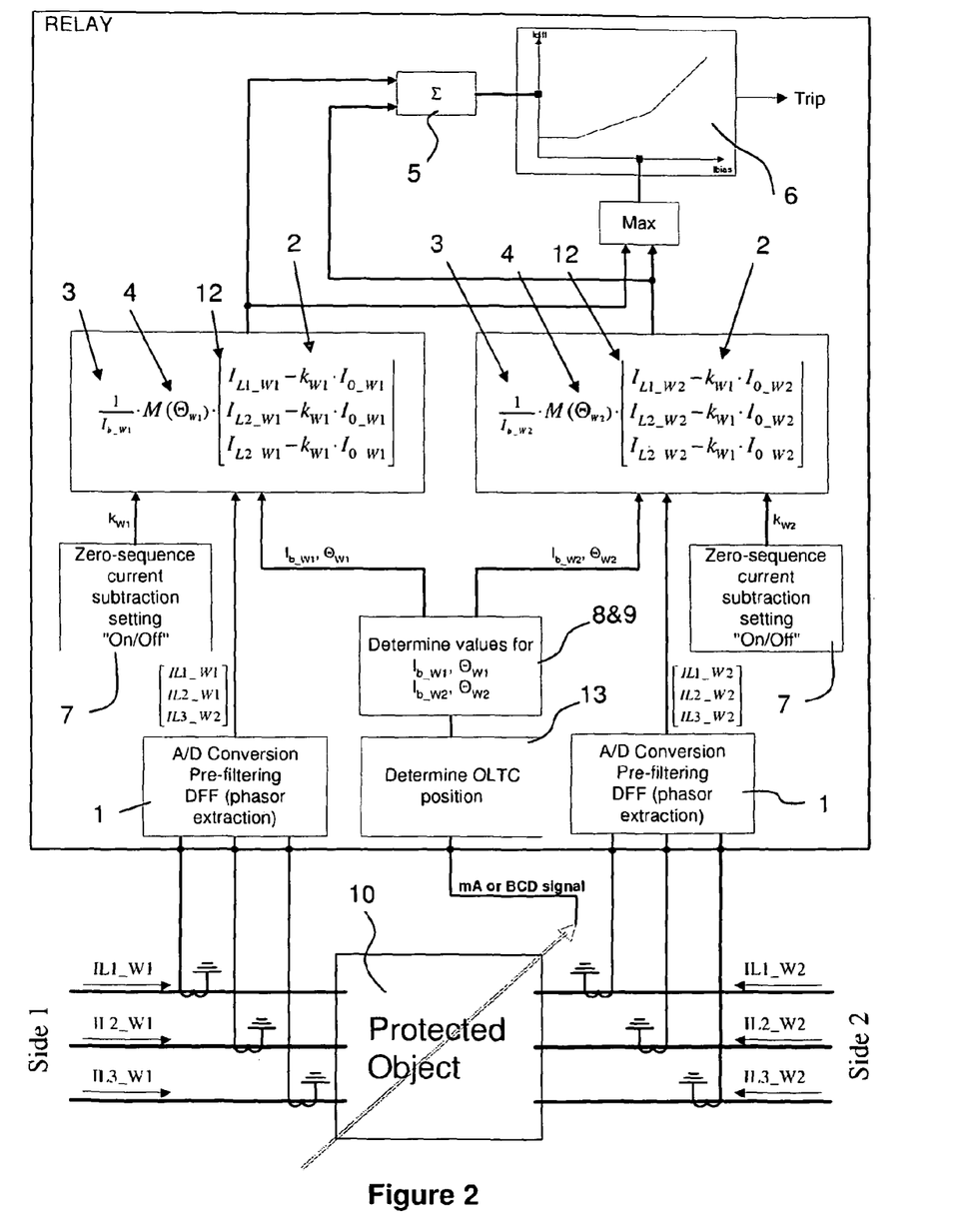
FIG. 2 illustrates the method according to FIG. 1 in more detail for a 2-winding power transformer or PST.

In FIG. 2 the method according to FIG. 1 is disclosed in more detail by a block diagram. The corresponding numbers have been used as in FIG. 1 in order to simplify the understanding of the invention.

The protected object 10 may be a power transformer of any type including phase shifting transformers. The protected object 10 is connected to a power network at both sides (side 1 and side 2).

The phase currents are measured in step 1 including A/D conversion, pre-filtering, DFF (phasor extraction) etc. In step 7 the zero-sequence current subtraction setting is done ("On-Off"). Necessary data to perform the magnitude and phase angle compensation are determined in blocks 8 and 9 in the figures. In case that the protected object 10 is coupled to an on-load tap changer (OLTC), the position of the OLTC is determined in block 13. The signals are needed for calculations like zero sequence current reduction 2, magnitude compensation 3 and phase angle compensation 4, therefore the resulting signals from both sides of the protected object 10 are then input to blocks 12, 3 and 4 respectively. The differential currents are finally calculated in block 5. When the differential currents achieve a certain signal level, a trip signal is released from block 6 that disconnects the protected object 10 from the rest of the power system.

In the following the fundamentals of the invention are described in further detail.

Magnitude Compensation

In order to achieve the current magnitude compensation, the measured phase currents must be normalized on all power transformer sides by dividing them with a so-called base current. The base current in primary amperes has a value, which shall be calculated for each power transformer side as per the following equation:

$$Ibase = \frac{Srmax}{\sqrt{3} \cdot Ur} \qquad (1.2)$$

where:

Srmax is the rated apparent power of a winding of the protected power transformer with maximum rating, and Ur is the rated phase-to-phase no-load voltage on the relevant side of the protected transformer.

It shall be noted that typically Ur can have different values for different OLTC positions at least on one side of the power transformer. Therefore the base current has different values for different OLTC positions as well. Therefore on the side where OLTC is located, different Ibase values shall be used for every OLTC position in order to compensate for current magnitude variations. Once this normalization of the measured currents is performed, the currents from the two sides are put on the same scale (i.e. now they are in pu) and they can be used to calculate differential current in pu.

It shall be noted that the above formula is given for the base current in primary amperes. For some relays this current can be converted to the secondary side of the CT by dividing the primary value with relevant CT ratio. In the further text all calculations will be shown in primary amperes.

Phase Angle Shift Compensation

In the following it will be assumed that the magnitude normalization of the currents from the two sides has been performed and that only the procedure for the compensation of the phase angle shift will be presented.

The common characteristic for a power transformer and a PST device is that they introduce the phase angle shift Θ between side 1 and side 2 voltages.

Standard power transformers as well introduce the phase shift between their terminal voltages. The only difference between a standard power transformer and a PST transformer is that:

- the phase shift Θ for the standard power transformer is fixed and in a multiple of 30° (i.e. n*30°; n=0, 1, 2, . . . 11) depending on the particular winding connections and transformer vector group,
- the phase shift Θ for the PST is variable. Typically one or more on-load tap-changers (OLTC) are used to perform this variable phase shift. The phase angle shift can be altered in a wide range (up to ±75°) while the OLTC can have from 10 to 70 steps.

As shown in Electrical Transmission and Distribution Reference Book, Chapter 5, $4^{th}$ Edition, Westinghouse Electric Corp., East Pittsburgh, Pa. 1950, strict rules exist for the phase angle shift between positive, negative and zero sequence no-load voltages on the two sides of a power transformer.

As soon as the power transformer is loaded this voltage relationship will not be valid anymore due to the voltage drop across the transformer. However, as shown in Electrical Transmission and Distribution Reference Book, Chapter 5, $4^{th}$ Edition, Westinghouse Electric Corp., East Pittsburgh, Pa. 1950, now the same relationship will be valid for the sequence currents which flow into the power transformer on side 1 and flow out from the power transformer on side 2.

Therefore the following relationships can be written for the positive, negative and zero sequence currents from the two sides (i.e. windings) for a power transformer or a PST.

$$IPS\_W1 = e^{j\Theta} \cdot IPS\_W2 \qquad (1.3)$$

$$INS\_W1 = e^{-j\Theta} \cdot INS\_W2 \qquad (1.4)$$

$$IZS\_W1 = IZS\_W2 \qquad (1.5)$$

The following will hold true for the sequence currents:

The positive sequence current from side 2 will lag the positive sequence current from side 1 exactly for the angle Θ (the same relationship as for positive sequence no-load voltages).

The negative sequence current from side 2 will lead the negative sequence current from side 1 exactly for the angle Θ (the same relationship as for negative sequence no-load voltages).

The zero sequence current from side 2 will be exactly in phase with the zero sequence current from side 1, when the zero sequence currents are at all transferred from one to the other side of the protected object (the same relationship as for zero sequence no-load voltages).

For differential protection typically currents from all sides of the protected object are measured with the same reference direction towards the protected object, as shown in FIG. 2. Therefore from now on such reference directions for current measurement will be used.

Because the relationships between the sequence currents on the two sides of the protected object are known, the sequence differential currents can be calculated in accordance with the following three equations:

$$Id\_PS = IPS\_W1 + e^{j\Theta} \cdot IPS\_W2$$

(1.6) Positive Sequence Differential Current.

$$Id\_NS = INS\_W1 + e^{-j\Theta} INS\_W2$$

(1.7) Negative Sequence Differential Current.

$$Id\_ZS = IZS\_W1 + IZS\_W2$$

(1.8) Zero Sequence Differential Current.

By using the basic relationship between sequence and phase quantities the following relationship can be then written for the phase-wise differential currents:

$$\begin{bmatrix} Id\_L1 \\ Id\_L2 \\ Id\_L3 \end{bmatrix} = A \cdot \begin{bmatrix} Id\_ZS \\ Id\_PS \\ Id\_NS \end{bmatrix} \qquad (1.9)$$

where $$A = \begin{bmatrix} 1 & 1 & 1 \\ 1 & a^2 & a \\ 1 & a & a^2 \end{bmatrix}, \qquad (1.10)$$

$$A^{-1} = \frac{1}{3} \cdot \begin{bmatrix} 1 & 1 & 1 \\ 1 & a & a^2 \\ 1 & a^2 & a \end{bmatrix}, \text{ and} \qquad (1.11)$$

-continued $$a = e^{j120°} = \cos(120°) + j\cdot\sin(120°) = -\frac{1}{2} + j\cdot\frac{\sqrt{3}}{2} \quad (1.12)$$

By combining equations (1.6), (1.7) and (1.8) into equation (1.9) and doing some basic re-arrangements the following equation can be derived:

$$\begin{bmatrix} Id\_L1 \\ Id\_L2 \\ Id\_L3 \end{bmatrix} = A \cdot \begin{bmatrix} IZS\_W1 \\ IPS\_W1 \\ INS\_W1 \end{bmatrix} + A \cdot \begin{bmatrix} IZS\_W2 \\ e^{j\theta}\cdot IPS\_W2 \\ e^{-j\theta}\cdot INS\_W2 \end{bmatrix} \quad (1.13)$$

$$= A \cdot \begin{bmatrix} IZS\_W1 \\ IPS\_W1 \\ INS\_W1 \end{bmatrix} + A \cdot \begin{bmatrix} 1 & 0 & 0 \\ 0 & e^{j\theta} & 0 \\ 0 & 0 & e^{-j\theta} \end{bmatrix} \cdot \begin{bmatrix} IZS\_W2 \\ IPS\_W2 \\ INS\_W2 \end{bmatrix}$$

By further elementary mathematical manipulation the following equation (1.14) can be derived:

$$\begin{bmatrix} Id\_L1 \\ Id\_L2 \\ Id\_L3 \end{bmatrix} = A \cdot \begin{bmatrix} IZS\_W1 \\ IPS\_W1 \\ INS\_W1 \end{bmatrix} + \quad (1.14)$$

$$A \cdot \begin{bmatrix} 1 & 0 & 0 \\ 0 & e^{j\theta} & 0 \\ 0 & 0 & e^{-j\theta} \end{bmatrix} \cdot (A^{-1}\cdot A)\cdot \begin{bmatrix} IZS\_W2 \\ IPS\_W2 \\ INS\_W2 \end{bmatrix} = \begin{bmatrix} IL1\_W1 \\ IL2\_W1 \\ IL3\_W1 \end{bmatrix} +$$

$$A \cdot \begin{bmatrix} 1 & 0 & 0 \\ 0 & e^{j\theta} & 0 \\ 0 & 0 & e^{-j\theta} \end{bmatrix} \cdot A^{-1} \cdot \begin{bmatrix} IL1\_W2 \\ IL2\_W2 \\ IL3\_W2 \end{bmatrix}$$

The equation (1.14) now represents the basic relationship between the phase-wise differential currents and the individual phase currents from the two sides of the protected object.

In order to further simplify equation (1.14), the new matrix $M(\Theta)$ is defined and simplified in the following equation:

$$M(\theta) = A \cdot \begin{bmatrix} 1 & 0 & 0 \\ 0 & e^{j\theta} & 0 \\ 0 & 0 & e^{-j\theta} \end{bmatrix} \cdot A^{-1} \quad (1.15)$$

$$= \frac{1}{3} \cdot \begin{bmatrix} 1+2\cdot\cos\theta & 1-\cos\theta-\sqrt{3}\cdot\sin\theta & 1-\cos\theta+\sqrt{3}\cdot\sin\theta \\ 1-\cos\theta+\sqrt{3}\cdot\sin\theta & 1+2\cdot\cos\theta & 1-\cos\theta-\sqrt{3}\cdot\sin\theta \\ 1-\cos\theta-\sqrt{3}\cdot\sin\theta & 1-\cos\theta+\sqrt{3}\cdot\sin\theta & 1+2\cdot\cos\theta \end{bmatrix}$$

Or by using the well-known trigonometric relationship $\cos(x\pm y)=\cos(x)\cdot\cos(y)\mp\sin(x)\cdot\sin(y)$ the following can be obtained:

$$M(\theta) = \frac{1}{3}\cdot\begin{bmatrix} 1+2\cdot\cos(\theta) & 1+2\cdot\cos(\theta+120°) & 1+2\cdot\cos(\theta-120°) \\ 1+2\cdot\cos(\theta-120°) & 1+2\cdot\cos(\theta) & 1+2\cdot\cos(\theta+120°) \\ 1+2\cdot\cos(\theta+120°) & 1+2\cdot\cos(\theta-120°) & 1+2\cdot\cos(\theta) \end{bmatrix} \quad (1.16)$$

Therefore now the equation (1.14) can be re-written as follows:

$$\begin{bmatrix} Id\_L1 \\ Id\_L2 \\ Id\_L3 \end{bmatrix} = \begin{bmatrix} IL1\_W1 \\ IL2\_W1 \\ IL3\_W1 \end{bmatrix} + M(\theta)\cdot\begin{bmatrix} IL1\_W2 \\ IL2\_W2 \\ IL3\_W2 \end{bmatrix} \quad (1.17)$$

$$= M(0°)\cdot\begin{bmatrix} IL1\_W1 \\ IL2\_W1 \\ IL3\_W1 \end{bmatrix} + M(\theta)\cdot\begin{bmatrix} IL1\_W2 \\ IL2\_W2 \\ IL\_W2 \end{bmatrix}.$$

Please observe that the $M(0°)$ can be assigned to the first side winding currents because this side is taken as reference side with zero degree phase shift.

Technical Alternatives to Obtain Correct Phase Angle Compensation Value

The proposed method is entirely dependent on that a correct value for the phase angle compensation is available to the fault detection algorithm. This phase angle can be obtained in one of the following ways:

1. for standard power transformers it is a fixed value determined by the protected power transformer vector group which is entered as a setting parameter by the user,
2. from a look-up table which describes the relationship between different OLTC positions and corresponding magnitude and phase angle variation of the protected power transformer/PST/FACTS device,
3. from two, three or more look-up tables similar to the one described in point 2. above for devices with more than one OLTC,
4. via a communication network as an exact present value from an external control system of the protected object (mostly applicable to FACTS devices like UPFC),
5. by an internal algorithm which during steady state operating conditions measures the phase angle difference between the positive sequence voltages from the two PST sides when the PST is not loaded or alternatively by measuring the phase angle between the positive sequence currents from the two PST sides when the PST is loaded.

Therefore, this invention could be used for differential protection of the following devices:

1) phase shifting transformers of any construction, 2) special industrial transformers with non-standard phase angle shift e.g. 22.5°, which are often used for big "MV Drives" or other special applications, 3) any standard transformer with n-windings, 4) any FACTS device which complies with above described principles.

Zero Sequence Current Elimination

Sometimes it is necessary to deduct the zero sequence current from one or both power transformer sides due to the fact that sometimes the zero sequence current is not properly transferred from one to the other side.

When zero sequence currents are not properly transferred they must be explicitly deducted from that power transformer side. In such case the following more general form of the equation (1.17) can be used:

$$\begin{bmatrix} \text{Id\_L1} \\ \text{Id\_L2} \\ \text{Id\_L3} \end{bmatrix} = M(0°) \cdot \begin{bmatrix} \text{IL1\_W1} - k_{W1} \cdot \text{Io\_W1} \\ \text{IL2\_W1} - k_{W1} \cdot \text{Io\_W1} \\ \text{IL3\_W1} - k_{W1} \cdot \text{Io\_W1} \end{bmatrix} + \quad (1.18)$$

$$M(\theta) \cdot \begin{bmatrix} \text{IL1\_W2} - k_{W2} \cdot \text{Io\_W2} \\ \text{IL2\_W2} - k_{W2} \cdot \text{Io\_W2} \\ \text{IL3\_W2} - k_{W2} \cdot \text{Io\_W2} \end{bmatrix}$$

where

Io_W1 is the zero sequence current on side 1 of the protected object,

Io_W2 is the zero sequence current on side 2 of the protected object, and $k_{W1}$ and $k_{W2}$ are setting parameters which can have values 0 or 1, which are set by the end user in order to enable/disable the zero sequence current reduction on any of the two sides.

By closer examination of equation (1.18) it is obvious that it is actually possible to deduct zero sequence currents in the following two ways:

by measuring the zero-sequence current at the winding common neutral point as described in the U.S. Pat. No. 5,790,357 by internal calculation of the zero-sequence currents from the individually measured three phase winding currents $$Io = \frac{I_{L1} + I_{L2} + I_{L3}}{3}. \quad (1.19)$$

In the second case it is then possible to include the zero-sequence current reduction into the M(Θ) matrix by defining a new matrix M0(Θ) which performs the phase shift compensation and the requested zero sequence current elimination at the same time in accordance with the following equation:

$$M0(\theta) = M(\theta) - \frac{1}{3} \cdot \begin{bmatrix} 1 & 1 & 1 \\ 1 & 1 & 1 \\ 1 & 1 & 1 \end{bmatrix} \quad (1.20)$$

-continued $$= \frac{2}{3} \cdot \begin{bmatrix} \cos(\theta) & \cos(\theta + 120°) & \cos(\theta - 120°) \\ \cos(\theta - 120°) & \cos(\theta) & \cos(\theta + 120°) \\ \cos(\theta + 120°) & \cos(\theta - 120°) & \cos(\theta) \end{bmatrix}$$

or by additional mathematical manipulation $$M0(\theta) = \frac{2}{3} \cdot \text{Re}\left(\begin{bmatrix} e^{j\theta} & e^{j(\theta+120°)} & e^{j(\theta-120°)} \\ e^{j(\theta-120°)} & e^{j\theta} & e^{j(\theta+120°)} \\ e^{j(\theta+120°)} & e^{j(\theta-120°)} & e^{j\theta} \end{bmatrix}\right) \quad (1.21)$$

$$= \frac{2}{3} \cdot \text{Re}\left(e^{j\theta} \cdot \begin{bmatrix} 1 & a & a^2 \\ a^2 & 1 & a \\ a & a^2 & 1 \end{bmatrix}\right)$$

Therefore now the equation (1.18) can be re-written as follows:

$$\begin{bmatrix} \text{Id\_L1} \\ \text{Id\_L2} \\ \text{Id\_L3} \end{bmatrix} = M0(0°) \cdot \begin{bmatrix} \text{IL1\_W1} \\ \text{IL2\_W1} \\ \text{IL3\_W1} \end{bmatrix} + M0(\theta) \cdot \begin{bmatrix} \text{IL1\_W2} \\ \text{IL2\_W2} \\ \text{IL3\_W2} \end{bmatrix} \quad (1.22)$$

It shall be noted that equations (1.22) and (1.17) actually have the same form. The only difference is which matrix (i.e. M(Θ) or M0(Θ)) is actually used. It shall be noticed that it is actually possible to mix (i.e. use both) matrices in one equation. In that case on the side where matrix M(Θ) is used the zero sequence current will not be removed, while on the other side where matrix M0(Θ) is used the zero sequence current will be removed. This is for example a typical requirement for the differential protection of a YNd connected power transformer.

It shall be noted that the matrix M0(Θ) is actually a numerical equivalent of a generalized normalization transform, which is described in the U.S. Pat. No. 6,507,184.

However the following shall be noted regarding the U.S. Pat. No. 6,507,184:

when M0(Θ) matrix is used on all sides of the protected object the differential protection sensitivity is unnecessarily reduced on the sides where it is not necessary to remove zero sequence currents when M0(Θ) matrix is used on all sides of the protected object the calculation of instantaneous differential current can be unnecessarily corrupted which can cause problems for proper operation of $2^{nd}$ and $5^{th}$ harmonic blocking/restraining criteria Therefore the presented invention in this document offers clear advantages in this respect.

Simultaneous Magnitude, Phase Angle and Zero Sequence Compensation

If now all three above-described compensations are put together in one equation the following complete equation in case of a two winding power transformer or PST can be written:

$$\begin{bmatrix} Id\_L1 \\ Id\_L2 \\ Id\_L3 \end{bmatrix} = \frac{1}{I_{b\_W1}} M(0°) \cdot \begin{bmatrix} IL1\_W1 - k_{W1} \cdot Io\_W1 \\ IL2\_W1 - k_{W1} \cdot Io\_W1 \\ IL3\_W1 - k_{W1} \cdot Io\_W1 \end{bmatrix} + \quad (1.23)$$

$$\frac{1}{I_{b\_W2}} M(\theta) \cdot \begin{bmatrix} IL1\_W2 - k_{W2} \cdot Io\_W2 \\ IL2\_W2 - k_{W2} \cdot Io\_W2 \\ IL3\_W2 - k_{W2} \cdot Io\_W2 \end{bmatrix}$$

Finally the following most general equation for an n-winding power transformer can be written in the following form:

$$\begin{bmatrix} I_{Diff\_L1} \\ I_{Diff\_L2} \\ I_{Diff\_L3} \end{bmatrix} = \sum_{i=1}^{n} \frac{1}{I_{b\_Wi}} \cdot M(\Theta_{Wi}) \cdot \begin{bmatrix} I_{L1\_Wi} - k_{Wi} \cdot I_{0\_Wi} \\ I_{L2\_Wi} - k_{Wi} \cdot I_{0\_Wi} \\ I_{L2\_Wi} - k_{Wi} \cdot I_{0\_Wi} \end{bmatrix} \quad (1.24)$$

where:

n is the number of windings within the protected transformer n=1, 2, 3, . . . , n (typically n≦6), $I_{Diff\_Lx}$ are the phase-wise differential currents in pu, $I_{b\_Wi}$ is the base current of the relevant winding as defined in equation (1.2) (It is a variable value if the winding incorporates OLTC), $M(\Theta_{Wi})$ is a 3×3 matrix which performs the dynamic phase angle shift compensation on the measured winding phase currents depending on the OLTC position in case of a PST, $I_{Lx\_Wi}$ are the measured winding phase currents, $k_{Wi}$ is the setting which determines whether zero sequence currents shall be subtracted from the measured winding phase currents or not (i.e. it can have value 0 or 1), and $I_{0\_Wi}$ is either the measured or the calculated winding zero sequence current.

Alternatively, when zero sequence reduction is performed by internal calculations based on $$I_{0\_Wi} = \frac{I_{L1\_Wi} + I_{L2\_Wi} + I_{L3\_Wi}}{3},$$

equation (1.24) can be rewritten as follows:

$$\begin{bmatrix} I_{Diff\_L1} \\ I_{Diff\_L2} \\ I_{Diff\_L3} \end{bmatrix} = \sum_{i=1}^{n} \frac{1}{I_{b\_Wi}} \cdot MX(\Theta_{Wi}) \cdot \begin{bmatrix} I_{L1\_Wi} \\ I_{L2\_Wi} \\ I_{L3\_Wi} \end{bmatrix}$$

where:

$MX(\Theta_{Wi})$ is equal either to $M(\Theta_{Wi})$ (see (1.16)) in case the zero sequence current is not removed or to $M0(\Theta_{Wi})$ (see (1.20)) in case the zero sequence current shall be removed.

The equation (1.24) illustrates the inventive step of the present invention. It is used to calculate the differential currents for power transformers with arbitrary phase angle shift between different windings. It can be directly used during protection (i.e. differential current calculations) of any power transformer, PSTs and FACTS devices. As it is shown in equation (1.13) the differential currents include positive, negative and zero sequence current components from all sides of the protected object, but alternatively zero sequence currents can be removed from any of the protected object sides if so required by the characteristics of the protected object.

The coefficients of the $M(\Theta)$ matrix are always real numbers. Therefore it shall be noted that the presented differential current calculation method can be used on fundamental frequency current phasors or instantaneous current values (i.e. samples). Thus the fundamental frequency and instantaneous differential currents can be calculated for the protected objects in the same way as in existing differential protections for standard three-phase power transformers. This means that all features already available like:

bias current calculation operate restraint characteristic unrestraint operational level $2^{nd}$ harmonic blocking $5^{th}$ harmonic blocking waveform blocking cross blocking sensitive negative sequence based external/internal fault discriminator, can be directly re-used. This principle has been disclosed in patent application WO 2005/064759 A1.

By calculating differential currents $I_{Diff\_Lx}$ using equation (1.24), a fault in the power transformer could theoretically be detected if one of the differential currents $I_{Diff\_Lx}$ begins to differ from zero. This holds true under normal through-load working conditions of the power transformer, i.e. when the power transformer is not saturated. In practice a fault is only detected if one of the differential currents exceeds a predetermined limit, in order to increase the fail-safety of the method. A differential current being unequal to zero indicates that there is a difference between the normalized input current and the normalized output current of the power transformer. The normalized input current corresponds to the normalized current of the primary winding W1 and the normalized output current for an n-winding power transformer corresponds to the sum of the normalized currents of all other windings W2 to Wn, where a phase shift of 180° is included (see FIG. 2, direction of output currents $I_{Lx\_W2}$). Therefore, the general fault detection method based on equation (1.24) can be described as a method, where the normalized current for the primary winding W1 is compared with the normalized currents for all other windings W2 to Wn.

One way to perform this comparison is by using equation (1.24) to explicitly calculate the differential currents $I_{Diff\_Lx}$.

Another way can be found when rewriting equation (1.24) in the following form:

$$\begin{bmatrix} I_{Diff\_L1} \\ I_{Diff\_L2} \\ I_{Diff\_L3} \end{bmatrix} = \frac{1}{I_{b\_W1}} \cdot M(\Theta_{W1}) \cdot \begin{bmatrix} I_{L1\_W1} - k_{W1} \cdot I_{0\_W1} \\ I_{L2\_W1} - k_{W1} \cdot I_{0\_W1} \\ I_{L3\_W1} - k_{W1} \cdot I_{0\_W1} \end{bmatrix} + \quad (1.25)$$

$$\sum_{i=2}^{n} \frac{1}{I_{b\_Wi}} \cdot M(\Theta_{Wi}) \cdot \begin{bmatrix} I_{L1\_Wi} - k_{Wi} \cdot I_{0\_Wi} \\ I_{L2\_Wi} - k_{Wi} \cdot I_{0\_Wi} \\ I_{L3\_Wi} - k_{Wi} \cdot I_{0\_Wi} \end{bmatrix}$$

Now the contributions of the primary winding W1, which is the first part of equation (1.25) and the contribution of all other windings W2 to Wn to the differential currents $I_{Diff\_Lx}$ can explicitly be seen.

Equation (1.24) could also be rewritten in any other way with the contribution of one of the n windings being extracted, i.e. the left side of equation (1.25) could be calculated for example for winding W2 instead of W1. Then the contribution of this single winding W2 would be compared to the contribution of the rest of the windings W1 and W3 to Wn. Therefore, equation (1.24) can in the most general way be regarded as the basis of a method to compare the normalized current of one single winding of the power transformer with the normalized currents of all other windings.

As already pointed out, if no internal fault occurs and under normal through-load working conditions of the power transformer the differential currents $I_{Diff\_Lx}$ should all be zero. Accordingly, the phasors of the two contributional parts of equation (1.25) are equal in their magnitude and have a phase displacement of 180° to each other. In mathematical terms this can be expressed by rewriting equation (1.24):

$$\frac{1}{I_{b\_W1}} \cdot M(\Theta_{W1}) \cdot \begin{bmatrix} I_{L1\_W1} - k_{W1} \cdot I_{0\_W1} \\ I_{L2\_W1} - k_{W1} \cdot I_{0\_W1} \\ I_{L3\_W1} - k_{W1} \cdot I_{0\_W1} \end{bmatrix} = \quad (1.26)$$

$$-\sum_{i=2}^{n} \frac{1}{I_{b\_Wi}} \cdot M(\Theta_{Wi}) \cdot \begin{bmatrix} I_{L1\_Wi} - k_{Wi} \cdot I_{0\_Wi} \\ I_{L2\_Wi} - k_{Wi} \cdot I_{0\_Wi} \\ I_{L3\_Wi} - k_{Wi} \cdot I_{0\_Wi} \end{bmatrix}$$

A fault can now be detected by simply comparing the left hand with the right hand side of equation (1.26), where the resulting phasors for each phase Lx, with x=1, 2 or 3, should be of the same magnitude and have a phase shift of 0°, i.e. be in phase to each other.

According to one embodiment of the invention, it has been found that equation (1.26) is now especially suited for the detection of a low-level turn-to-turn fault. In case of a low-level turn-to-turn fault the magnitudes of the two sides of equation (1.26) will show almost no relevant difference to each other, due to the comparatively high ratio of transformation between the affected transformer winding as a whole and the few short-circuited terms. But at the same time, a phase shift will occur in the corresponding phase in equation (1.26) which will take an arbitrary value different from 0°, due to the high current in the short-circuited turns.

Therefore, by monitoring the phase angle between the two contributions to the differential currents of equation (1.25) or likewise by monitoring the phase shift between the two sides of equation (1.26) continuously and for each of the three phases, a sensitive but simple method to detect low-level turn-to-turn faults is achieved. A turn-to-turn fault is notified as soon as the phase shift reaches a predetermined level, for example 4°.

In addition to monitoring the individual phase currents, a monitoring of the phase shift between positive and negative sequence component contributions can be used as further check criteria.

In order to further improve the fail safety of the fault detection method an additional step can be included where the phase angle shift of each of the three phases of equation (1.26) is determined and evaluated. If each of the three phases shows practically the same phase angle shift a problem in the phase angle compensation is indicated, since a three-phase-fault is quite unlikely to occur. To further prove that a phase angle compensation problem exists, the phase angle shift of the positive sequence current can be determined by comparing winding W1 with all other windings W2 to Wn. If this fourth phase angle shift is of the same value as the phase angle shifts of the three phases of equation (1.26), the indication of a faulty phase angle compensation is approved.

Since the equations (1.25) and (1.26), respectively, require normal through-load conditions, the monitoring of the phase angle or phase shift should be disabled when the through-going current, which is in practice the bias current, takes a value outside a predefined band of current values, where the band of current values is defined by a minimum and a maximum current level.

The invention claimed is:

1. A method for fault detection in an n-winding, three-phase power transformer, the method comprising:

for each winding (Wi, where i=1, . . . , n):

measuring the three phase currents ($I_{L1\_Wi}$; $I_{L2\_Wi}$; $I_{L3\_Wi}$), deciding if a zero sequence current ($I_{0\_Wi}$) reduction is to be performed depending on at least one user setting ($k_{Wi}$) and if so, deducting the zero sequence current ($I_{0\_Wi}$) from each of the three phase currents ($I_{L1\_Wi}$; $I_{L2\_Wi}$; $I_{L3\_Wi}$), generating normalized currents by performing a magnitude compensation and a phase angle shift compensation on the results of the previous step, followed by for each phase (Lx, where x=1, 2, 3):

comparing the normalized current of a single winding with the normalized currents of all other windings, and generating a fault signal, if a difference between the single winding and all other windings exceeds a predefined level.

2. The method according to claim 1, wherein the single winding is the primary winding (W1) and all other windings are the second and the following windings (W2, . . . , Wn).

3. The method according to claim 1, wherein for each phase (Lx) the normalized currents are compared by adding the normalized current of the single winding (W1) to the sum of the normalized currents of all other windings, thereby determining the phase-wise differential currents ($I_{Diff\_Lx}$) according to:

$$\begin{bmatrix} I_{Diff\_L1} \\ I_{Diff\_L2} \\ I_{Diff\_L3} \end{bmatrix} = \sum_{i=1}^{n} \frac{1}{I_{b\_Wi}} \cdot M(\Theta_{Wi}) \cdot \begin{bmatrix} I_{L1\_Wi} - k_{Wi} \cdot I_{0\_Wi} \\ I_{L2\_Wi} - k_{Wi} \cdot I_{0\_Wi} \\ I_{L2\_Wi} - k_{Wi} \cdot I_{0\_Wi} \end{bmatrix}$$

with $$M(\Theta_{Wi}) = \frac{1}{3} \cdot \begin{bmatrix} 1+2\cdot\cos(\Theta_{Wi}) & 1+2\cdot\cos(\Theta_{Wi}+120°) & 1+2\cdot\cos(\Theta_{Wi}-120°) \\ 1+2\cdot\cos(\Theta_{Wi}-120°) & 1+2\cdot\cos(\Theta_{Wi}) & 1+2\cdot\cos(\Theta_{Wi}+120°) \\ 1+2\cdot\cos(\Theta_{Wi}+120°) & 1+2\cdot\cos(\Theta_{Wi}-120°) & 1+2\cdot\cos(\Theta_{Wi}) \end{bmatrix},$$

and where a fault signal is generated if one of the phase-wise differential currents ($I_{Diff\_Lx}$) exceeds a predefined level.

4. The method according to claim 1, wherein for each phase (Lx) the normalized currents are compared by comparing the phasor of the normalized current of the single winding (W1) with the negative phasor of the sum of the normalized currents of all other windings (W2, . . . , Wn) according to:

$$\frac{1}{I_{b\_W1}} \cdot M(\Theta_{W1}) \cdot \begin{bmatrix} I_{L1\_W1} - k_{W1} \cdot I_{0\_W1} \\ I_{L2\_W1} - k_{W1} \cdot I_{0\_W1} \\ I_{L3\_W1} - k_{W1} \cdot I_{0\_W1} \end{bmatrix} =$$

$$-\sum_{i=2}^{n} \frac{1}{I_{b\_Wi}} \cdot M(\Theta_{Wi}) \cdot \begin{bmatrix} I_{L1\_Wi} - k_{Wi} \cdot I_{0\_Wi} \\ I_{L2\_Wi} - k_{Wi} \cdot I_{0\_Wi} \\ I_{L3\_Wi} - k_{Wi} \cdot I_{0\_Wi} \end{bmatrix}$$

with $$M(\Theta_{Wi}) = \frac{1}{3} \cdot \begin{bmatrix} 1+2\cdot\cos(\Theta_{Wi}) & 1+2\cdot\cos(\Theta_{Wi}+120°) & 1+2\cdot\cos(\Theta_{Wi}-120°) \\ 1+2\cdot\cos(\Theta_{Wi}-120°) & 1+2\cdot\cos(\Theta_{Wi}) & 1+2\cdot\cos(\Theta_{Wi}+120°) \\ 1+2\cdot\cos(\Theta_{Wi}+120°) & 1+2\cdot\cos(\Theta_{Wi}-120°) & 1+2\cdot\cos(\Theta_{Wi}) \end{bmatrix},$$

and where a fault signal is generated if for one of the phases (Lx) the magnitude and/or the phase angle between the corresponding two phasors exceeds a predefined level.

5. The method according to claim 4, wherein additionally the phase angle shift between the single winding (W1) and all other windings (W2 to Wn) is checked for the positive and negative sequence component contributions.

6. The method according to claim 4, wherein the three phase angles between the corresponding two phasors of the three phases (Lx) are compared and where a fault in the phase angle shift compensation is indicated if the three phase angles are of equal size.

7. The method according to claim 5, wherein the phase angle shift of the positive sequence component contribution is compared to the three phase angles and where a fault in the phase angle shift compensation is approved if they are all of equal size.

8. The method according to claim 1, wherein for at least one of the windings (Wi) the zero sequence current ($I_{0\_Wi}$) is measured at the windings common neutral point.

9. The method according to claim 1, wherein for at least one of the windings (Wi) the zero sequence current ($I_{0\_Wi}$) is determined from the three measured phase currents ($I_{L1\_Wi}$; $I_{L2\_Wi}$; $I_{L3\_Wi}$) using the equation:

$$I_{0\_Wi} = \frac{I_{L1\_Wi} + I_{L2\_Wi} + I_{L3\_Wi}}{3}.$$

10. The method according to claim 1, wherein for each of the windings (Wi) the magnitude compensation is performed by dividing the measured phase currents ($I_{L1\_Wi}$; $I_{L2\_Wi}$; $I_{L3\_Wi}$) through by a base current ($I_{b\_Wi}$) using the equation:

$$I_{b\_Wi} = \frac{S_{max\_Wi}}{\sqrt{3} \cdot U_r},$$

where $S_{max\_Wi}$ is the three-phase rated power of the corresponding winding (Wi) and $U_r$ is the rated phase-to-phase no-load voltage of the corresponding winding (Wi).

11. The method according to claim 1, wherein the fault detection is performed at a power transformer having variable phase angle shift or a fixed phase angle shift other than 30° and other than a multiple of 30°.

12. The method according to claim 1, wherein in the case that the power transformer is coupled to an on-load tap changer (OLTC), the base current ($I_{b\_Wi}$) for the corresponding winding (Wi) is determined according to the position (13) of the tap-changer.

13. The method according to claim 1, wherein the phase angle ($\Theta i$) for the phase angle shift compensation is determined for each winding (Wi) by reading in at least one fixed parameter set by a user.

14. The method according to claim 12, wherein the phase angle ($\Theta i$) for the phase angle shift compensation is determined from a look-up table corresponding to the winding (Wi) of the on-load tap changer which describes the relationship between different on-load tap changer positions and corresponding phase angle variations.

15. The method according to claim 14, wherein in case of multiple on-load tap changers the phase angle ($\Theta i$) for the phase angle shift compensation is determined for the corresponding windings (Wi) from more than one look-up tables according to the number of tap changers.

16. The method according to claim 1, wherein the phase angle ($\Theta i$) for the phase angle shift compensation is received for each winding (Wi) via a communication network from an external control system.

17. The method according to claim 1, wherein in the case of a phase shifting transformer the phase angle ($\Theta i$) for the phase angle shift compensation (4) is determined for each winding (Wi) by an internal algorithm from the positive sequence voltages when the phase shifting transformer is not loaded or from the positive sequence currents when the phase shifting transformer is loaded.

18. A device for fault detection in an n-winding, three-phase power transformer comprising:
- means to measure the three phase currents ($I_{L1\_Wi}$; $I_{L2\_Wi}$; $I_{L3\_Wi}$) for each of the windings (Wi, where i=1, ... n),
- means to decide for each of the windings (Wi) if a zero sequence current ($I_{0\_Wi}$) reduction is to be performed depending on at least one user setting ($k_{Wi}$) and if so, to deduct the zero sequence current ($I_{0\_Wi}$) from each of the three phase currents ($I_{L1\_Wi}$; $I_{L2\_Wi}$; $I_{L3\_Wi}$),
- means to generate for each of the windings (Wi) normalized currents by performing a magnitude compensation and a phase angle shift compensation on the results of the previous step,
- means to compare for each phase (Lx, where x=1, 2, 3) the normalized current of the primary winding (W1) with the normalized currents of all other windings (W2, ..., Wn), and
- means to generate for each phase (Lx) a fault signal, if a difference between the primary winding (W1) and all other windings (W2, ..., Wn) exceeds a predefined level.

19. A computer program product, comprising:
one or more computer readable media; and
computer program instructions recorded on the computer readable media and executable by a processor for implementing a method comprising
for each winding (Wi, where i=1, ..., n) in an n-winding, three-phase power transformer:
- measuring the three phase currents ($I_{L1\_Wi}$; $I_{L2\_Wi}$; $I_{L3\_Wi}$),
- deciding if a zero sequence current ($I_{0\_Wi}$) reduction is to be performed depending on at least one user setting ($k_{Wi}$) and if so, deducting the zero sequence current ($I_{0\_Wi}$) from each of the three phase currents ($I_{L1\_Wi}$; $I_{L2\_Wi}$; $I_{L3\_Wi}$),
- generating normalized currents by performing a magnitude compensation and a phase angle shift compensation on the results of the previous step, followed by for each phase (Lx, where x=1, 2, 3):
- comparing the normalized current of a single winding with the normalized currents of all other windings, and
- generating a fault signal, if a difference between the single winding and all other windings exceeds a predefined level.

* * * * *